United States Patent
Ma et al.

(10) Patent No.: US 11,099,081 B2
(45) Date of Patent: Aug. 24, 2021

(54) CURRENT GENERATING CIRCUITS CAPABLE OF GENERATING CURRENTS WITH DIFFERENT TEMPERATURE COEFFICIENTS AND FLEXIBLY ADJUSTING SLOPE OF THE TEMPERATURE COEFFICIENT

(71) Applicant: Winbond Electronics Corp., Taichung (TW)

(72) Inventors: Ying-Ting Ma, Zhubei (TW); Jing-Chyi Wang, Taichung (TW)

(73) Assignee: WINBOND ELECTRONICS CORP., Taichung (TW)

( * ) Notice: Subject to any disclaimer, the term of this patent is extended or adjusted under 35 U.S.C. 154(b) by 161 days.

(21) Appl. No.: 16/460,128

(22) Filed: Jul. 2, 2019

(65) Prior Publication Data
US 2020/0011742 A1    Jan. 9, 2020

(30) Foreign Application Priority Data
Jul. 9, 2018 (TW) .................. 10712368.6

(51) Int. Cl.
| | | |
|---|---|---|
| *G01K 7/01* | (2006.01) | |
| *G05F 3/24* | (2006.01) | |
| *H01C 7/04* | (2006.01) | |
| *H01C 7/02* | (2006.01) | |

(52) U.S. Cl.
CPC .................. *G01K 7/01* (2013.01); *G05F 3/24* (2013.01); *H01C 7/02* (2013.01); *H01C 7/04* (2013.01)

(58) Field of Classification Search
None
See application file for complete search history.

(56) References Cited

U.S. PATENT DOCUMENTS

| | | | |
|---|---|---|---|
| 6,531,911 | B1 | 3/2003 | Hsu et al. |
| 7,439,601 | B2 | 10/2008 | Hartley |
| 9,739,669 | B2 | 8/2017 | Susak et al. |
| 2005/0248397 | A1* | 11/2005 | Aota ..................... H01L 27/016 327/567 |

* cited by examiner

*Primary Examiner* — Erica S Lin
(74) *Attorney, Agent, or Firm* — Muncy, Geissler, Olds & Lowe, P.C.

(57) ABSTRACT

A current generating circuit includes a first circuit subunit, a second circuit subunit and a third circuit subunit. The first circuit subunit is configured to generate a first current having a first temperature coefficient. The first temperature coefficient is a negative temperature coefficient. The second circuit subunit is configured to generate a second current having a second temperature coefficient. The second temperature coefficient is a positive temperature coefficient. The third circuit subunit is configured to generate a third current having a third temperature coefficient according to a difference between the first current and the second current. An absolute value of a slope of the third temperature coefficient is greater than that of the first temperature coefficient or that of the second temperature coefficient.

7 Claims, 4 Drawing Sheets

CURRENT GENERATING CIRCUITS CAPABLE OF GENERATING CURRENTS WITH DIFFERENT TEMPERATURE COEFFICIENTS AND FLEXIBLY ADJUSTING SLOPE OF THE TEMPERATURE COEFFICIENT

CROSS REFERENCE TO RELATED APPLICATIONS

This application claims priority of Taiwan Patent Application No. 107123686, filed on Jul. 9, 2018, the entirety of which is incorporated by reference herein.

BACKGROUND OF THE INVENTION

Field of the Invention

The invention relates to a current generating circuit, and more particularly to a current generating circuit capable of generating currents with different temperature coefficients according to different requirements and also capable of flexibly adjusting the slope (or gradient) of the temperature coefficient of the current.

Description of the Related Art

Process, voltage, and temperature (PVT) variations are one of the critical factors that may hamper the performance of ICs. For example, PVT variations can result in a change in the intrinsic offset of a comparator. However, a comparator is an important part of any electronic system. For example, voltage sensor circuits and temperature sensor circuits usually include one or more comparators.

When the intrinsic offset of a comparator increases due to PVT variations, the error-detection range of a detection circuit has to be increased accordingly. However, under the requirements for low-power consumption as well as high speed of the modern electronic equipment, the requirements for temperature detection accuracy are becoming correspondingly stricter. Therefore, the acceptable temperature detection error for each electronic device has been greatly reduced.

Therefore, a current generating circuit that is capable of generating currents with different temperature coefficients according to different requirements and also capable of flexibly adjusting the slope (or gradient) of the temperature coefficient of the current is proposed. When the current generating circuit is applied in a temperature sensor circuit, the accuracy of temperature detection can be increased accordingly, to resist changes in the characteristics of various electronic components due to PVT variations.

BRIEF SUMMARY OF THE INVENTION

Current generating circuits are provided. An exemplary embodiment of a current generating circuit comprises a first circuit subunit, a second circuit subunit and a third circuit subunit. The first circuit subunit is configured to generate a first current having a first temperature coefficient. The first temperature coefficient is a negative temperature coefficient. The second circuit subunit is configured to generate a second current having a second temperature coefficient. The second temperature coefficient is a positive temperature coefficient. The third circuit subunit is configured to generate a third current having a third temperature coefficient according to a difference between the first current and the second current. An absolute value of a slope of the third temperature coefficient is greater than an absolute value of a slope of the first temperature coefficient or an absolute value of a slope of the second temperature coefficient.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
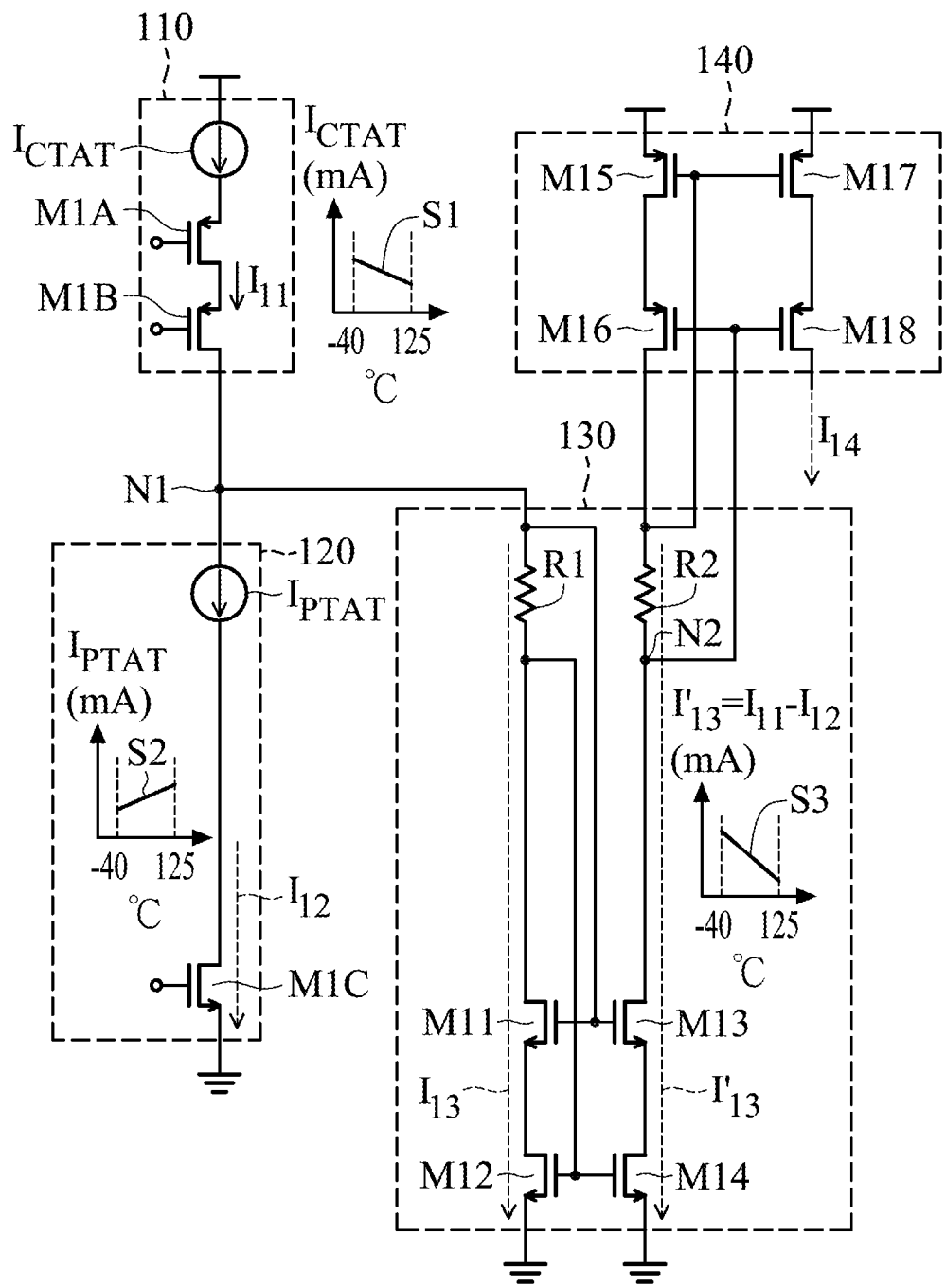
FIG. 1 is an exemplary circuit diagram of a current generating circuit according to an embodiment of the invention.

FIG. 1 is an exemplary circuit diagram of a current generating circuit according to an embodiment of the invention. The current generating circuit 100 may comprise circuit subunits 110, 120 and 130. The circuit subunit 110 is configured to generate a current $I_{11}$ having a first temperature coefficient. The first temperature coefficient is a negative temperature coefficient. That is, the level of current decreases as the temperature increases. The circuit subunit 120 is configured to generate a current $I_{12}$ having a second temperature coefficient. The second temperature coefficient is a positive temperature coefficient. That is, the level of current increases as the temperature increases. The circuit subunit 130 is coupled to the circuit subunits 110 and 120 and configured to generate a current $I_{13}$ having a third temperature coefficient according to the current $I_{11}$ and the current $I_{12}$. The circuit subunit 130 is configured to adjust the slope of the temperature coefficient of the current so that the absolute value of the slope of the third temperature coefficient is greater than that of the first temperature coefficient or that of the second temperature coefficient.

According to an embodiment of the invention, the circuit subunit 130 may be a current subtraction circuit, which generates the current $I_{13}$ according to the difference between the current $I_{11}$ and the current $I_{12}$. For example, the circuit subunits 130 and 120 may both be coupled to the node N1 and the circuit subunits 130 and 120 may both draw current from the circuit subunit 110. In other words, according to an embodiment of the invention, the current $I_{11}$ is the sum of the current $I_{13}$ and the current $I_{12}$. Therefore, in this embodiment, the third temperature coefficient of the current $I_{13}$ is a negative temperature coefficient, and in the operation of current subtraction discussed above, a current having a positive temperature coefficient (as an example, the current $I_{12}$) is subtracted from a current having a negative temperature coefficient (as an example, the current $I_{11}$) to generate a current (as an example, the current $I_{13}$) having a negative temperature coefficient (the third temperature coefficient). Via the current subtraction, the absolute value of the slope of the third temperature coefficient will be greater than that of the first temperature coefficient (which is also a negative temperature coefficient) of the current $I_{11}$.

According to an embodiment of the invention, the circuit subunit 110 may comprise a current source configured to provide a fundamental current $I_{CTAT}$ having a first fundamental temperature coefficient. In this embodiment, the fundamental current $I_{CTAT}$ is a current which is complementary to absolute temperature (CTAT). Therefore, the first fundamental temperature coefficient is a negative temperature coefficient. An exemplary diagram of the first fundamental temperature coefficient is also shown in FIG. 1, where the slope of the first fundamental temperature coefficient is S1. The circuit subunit 120 may comprise another current source configured to provide a fundamental current $I_{PTAT}$ having a second fundamental temperature coefficient. In this embodiment, the fundamental current $I_{PTAT}$ is a current which is proportional to absolute temperature (PTAT). Therefore, the second fundamental temperature coefficient is a positive temperature coefficient. An exemplary diagram of the second fundamental temperature coefficient is also shown in FIG. 1, where the slope of the second fundamental temperature coefficient is S2.

Figure 2:
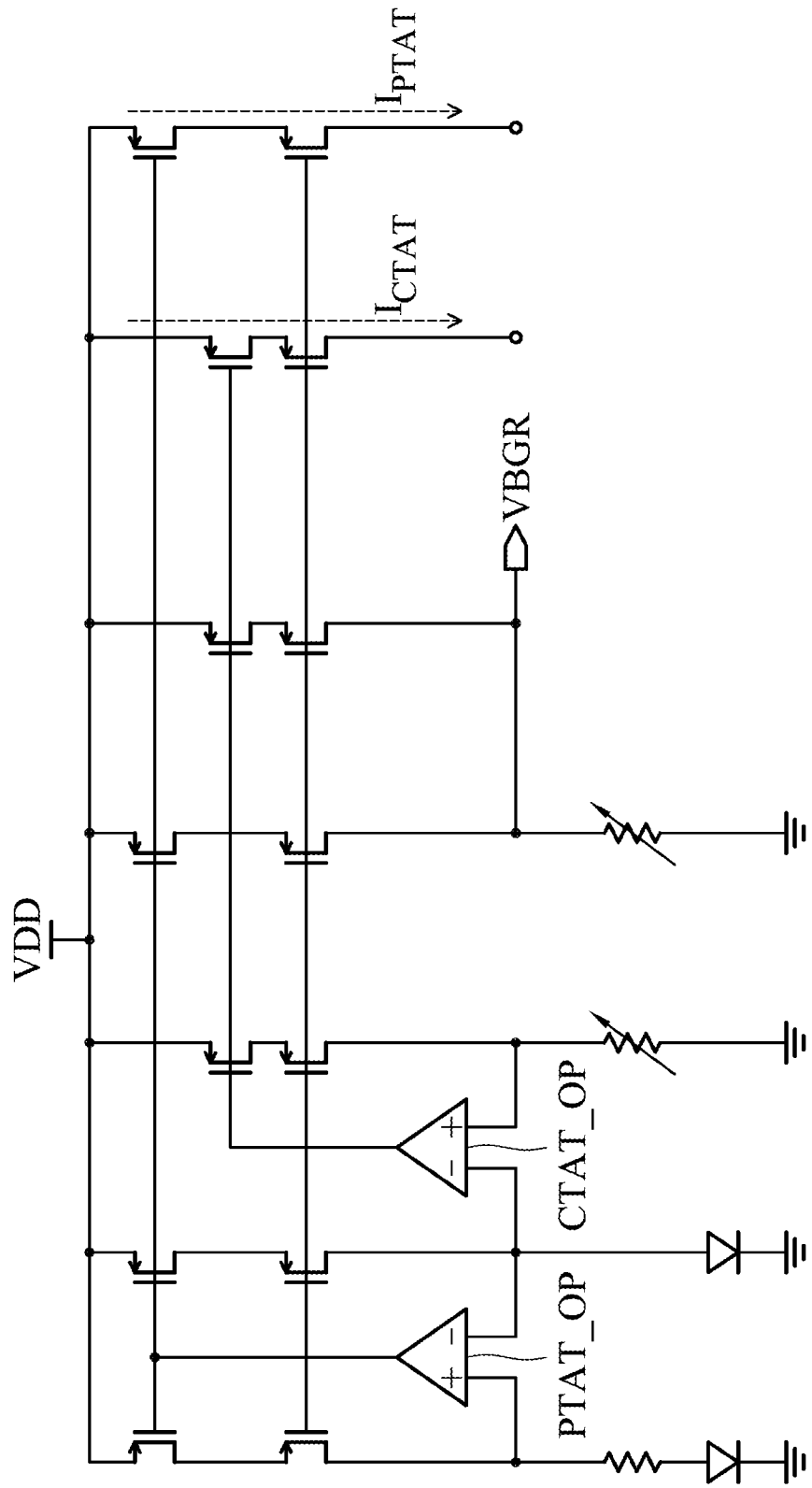
FIG. 2 is an exemplary circuit diagram of a Bandgap regulator.

According to an embodiment of the invention, the current generating circuit 100 may obtain the fundamental currents $I_{CTAT}$ and $I_{PTAT}$ from a Bandgap regulator. FIG. 2 is an exemplary circuit diagram of a Bandgap regulator. The Bandgap regulator may comprise a comparator PTAT_OP which is proportional to absolute temperature, a comparator CTAT_OP which is complementary to absolute temperature, and a plurality of diodes and a plurality of transistors, and is configured to generate the fundamental currents $I_{CTAT}$ and $I_{PTAT}$ according to the voltages VDD and VBGR.

According to an embodiment of the invention, the circuit subunit 110 may comprise one or more transistors, such as the transistors M1A and M1B and may be configured to generate the current $I_{11}$ according to the fundamental current $I_{CTAT}$. The circuit subunit 120 may further comprise one or more transistors, such as the transistor M1C and may be configured to generate the current $I_{12}$ according to the fundamental current $I_{PTAT}$. According to an embodiment of the invention, the transistors MIA and M1B may be P type Metal-Oxide-Semiconductor Field Effect Transistor (MOSFET) (hereinafter called PMOS transistors). The transistor MIC may be an N type MOSFET (hereinafter called NMOS transistor).

According to an embodiment of the invention, the circuit subunit 130 may comprise one or more current mirror circuits, such as the current mirror circuit formed by the transistors M11, M12, M13 and M14, and may be configured to generate the current $I'_{13}$ based on the current $I_{13}$. The current $I'_{13}$ is proportional to the current $I_{13}$. The sizes of the transistors M11, M2, M13 and M14 may be adequately designed based on the required amplification or reduction ratio of the slope, such that the current $I_{13}$ may be amplified or reduced according to the requirements. In this embodiment, the sizes of the transistors M11, M12, M13 and M14 are designed to be identical. Therefore, the current $I_{13}$ is substantially equal to the current $I'_{13}$. That is, the current $I'_{13}$ is substantially equal to ($I_{11}-I_{12}$) and has the third temperature coefficient as the current $I_{13}$. An exemplary diagram of the third fundamental temperature coefficient is also shown in FIG. 1, where the slope of the third fundamental temperature coefficient is S3. As shown in FIG. 1, in this embodiment, the absolute value of the slope S3 is greater than that of the slope S1. According to an embodiment of the invention, the transistors M11, M112, M13 and M14 may be NMOS transistors.

According to an embodiment of the invention, when the slope of the temperature coefficient of the output current has to be adjusted further, the current generating circuit 100 may further comprise a circuit subunit 140. The circuit subunit 140 may comprise one or more current mirror circuits. For example, the current mirror circuit formed by the transistors M15, M16, M17 and M18, which is configured to generate the current $I_{14}$ based on the current $I'_{13}$. The current $I_{14}$ is proportional to the current $I'_{13}$. The sizes of the transistors M15, M16, M17 and M18 may be adequately designed based on the required amplification or reduction ratio of the slope, such that the current $I'_{13}$ may be amplified or reduced according to the requirements. In this embodiment, the sizes of the transistors M17 and M18 may be designed as a multiple of the sizes of the transistors M15 and M16, as an example, the sizes of the transistors M17 and M18 may be 4 times of the sizes of the transistors M15 and M16. Therefore, the current $I_{14}$ may be 4 times of the current $I'_{13}$, and have a fourth temperature coefficient. By amplifying the current, the absolute value of the slope of the fourth temperature coefficient is greater than the absolute value of the slope of the third temperature coefficient. According to an embodiment of the invention, the transistors M15, M16, M17 and M18 may be PMOS transistors.

It should be noted that, in the embodiments of the invention, for the current mirror circuit to be able to accurately mirror the current, the coupling of the gate electrodes of the transistors can be specially designed. According to an embodiment, the current generating circuit 100 may comprise a resistor R1 coupled between the node N1 and a drain of the transistor M1, and the gates of the transistors M11 and M12 are respectively coupled to two terminals of the resistor R1. In this manner, the circuit subunit 130 can accurately map the current $I_{13}$ to generate the current $I'_{13}$.

Similarly, according to an embodiment of the invention, the current generating circuit 100 may comprise a resistor R2, coupled between the terminal N2 and the transistor M16, and the gates of the transistors M15 and M16 are respectively coupled to two terminals of the resistor R2. In this manner, the circuit subunit 140 can accurately map the current $I'_{13}$ to generate the current $I_{14}$.

Figure 3:
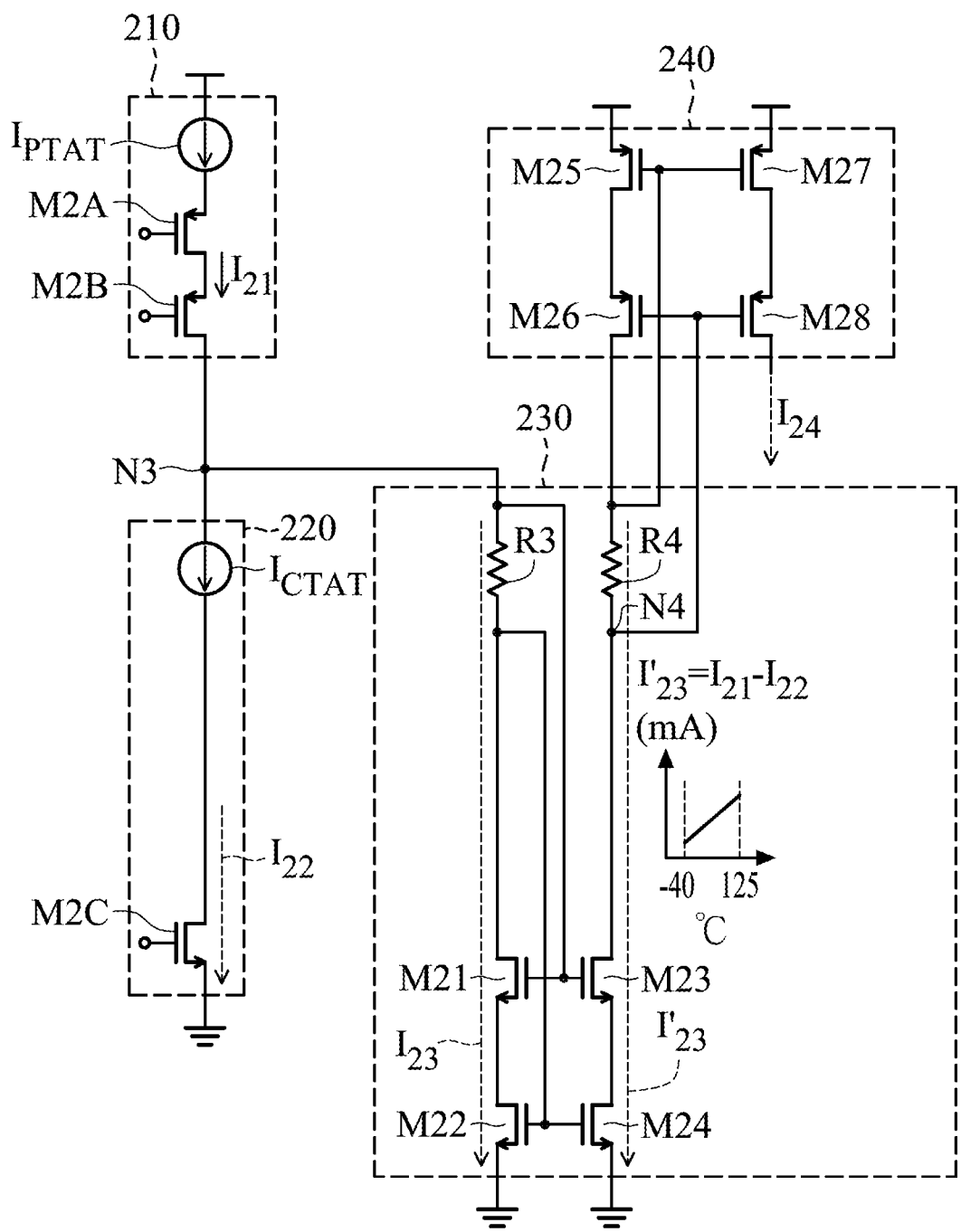
FIG. 3 is an exemplary circuit diagram of a current generating circuit according to another embodiment of the invention.

FIG. 3 is an exemplary circuit diagram of a current generating circuit according to another embodiment of the invention. The current generating circuit 200 may comprise circuit subunits 210, 220 and 230. The circuit subunit 210 is configured to generate the current $I_{21}$ having a first temperature coefficient. In this embodiment, the first temperature coefficient is a positive temperature coefficient. The circuit subunit 220 is configured to generate a current $I_{22}$ having a second temperature coefficient. In this embodiment, the second temperature coefficient is a negative temperature coefficient. The circuit subunit 230 is coupled to the circuit subunits 210 and 220 and configured to generate a current $I_{23}$ having a third temperature coefficient according to the current $I_{21}$ and the current $I_{22}$. The circuit subunit 230 is configured to adjust the slope of the temperature coefficient of the current so that the absolute value of the slope of the third temperature coefficient is greater than that of the first temperature coefficient or that of the second temperature coefficient.

According to an embodiment of the invention, the circuit subunit 230 may be a current subtraction circuit, which generates the current $I_{23}$ according to the difference between the current $I_{21}$ and the current $I_{22}$. Therefore, in this embodiment, the third temperature coefficient of the current $I_{23}$ is a positive temperature coefficient, and the absolute value of the slope of the third temperature coefficient of the obtained current $I_{23}$ is greater than that of the first temperature coefficient (which is also a positive temperature coefficient) of the current $I_{21}$.

According to an embodiment of the invention, the circuit subunit 210 may comprise a current source configured to provide a fundamental current $I_{PTAT}$ having a first fundamental temperature coefficient. In this embodiment, the fundamental current $I_{PTAT}$ is a current which is proportional to absolute temperature (PTAT). The circuit subunit 220 may comprise another current source configured to provide a fundamental current $I_{CTAT}$ having a second fundamental temperature coefficient. In this embodiment, the fundamental current $I_{CTAT}$ is a current which is complementary to absolute temperature.

According to an embodiment of the invention, the current generating circuit 200 may obtain the fundamental currents $I_{CTAT}$ and $I_{PTAT}$ from a Bandgap regulator. In addition, according to an embodiment of the invention, the circuit subunit 210 may further comprise one or more transistors, such as the transistors M2A and M2B, and may be configured to generate the current $I_{21}$ according to the fundamental current $I_{PTAT}$. The circuit subunit 220 may further comprise one or more transistors, such as the transistor M2C and may be configured to generate the current $I_{22}$ according to the fundamental current $I_{CTAT}$. According to an embodiment of the invention, the transistors M2A and M2B may be PMOS transistors, and the transistor M2C may be an NMOS transistor.

According to an embodiment of the invention, the circuit subunit 230 may comprise one or more current mirror circuits, such as the current mirror formed by the transistors M21, M22, M23 and M24, and may be configured to generate the current $I'_{23}$ based on the current $I_{23}$. The current $I'_{23}$ is proportional to the current $I_{23}$. The sizes of the transistors M21, M22, M23 and M24 may be adequately designed based on the required amplification or reduction ratio of the slope, such that the current $I_{23}$ may be amplified or reduced according to the requirements. In this embodiment, the sizes of the transistors M21, M22, M23 and M24 are designed to be identical. Therefore, the current $I_{23}$ is substantially equal to the current $I'_{23}$ and has the third temperature coefficient as the current $I_{23}$. An exemplary diagram of the third fundamental temperature coefficient is also shown in FIG. 3. As shown in FIG. 3, in this embodiment, the absolute value of the slope of the third fundamental temperature coefficient is greater than that that of the first fundamental temperature coefficient. According to an embodiment of the invention, the transistors M21, M22, M23 and M24 may be NMOS transistors.

According to an embodiment of the invention, when the slope of the temperature coefficient of the output current has to be adjusted further, the current generating circuit 200 may further comprise a circuit subunit 240. The circuit subunit 240 may comprise one or more current mirror circuits. For example, the current mirror circuit formed by the transistors M25, M26, M27 and M28. The structure and operation of circuit subunit 240 are similar to those of circuit subunit 140 discussed above. Therefore, the details and descriptions are the same as those for circuit subunit 140 and they are not repeated here, for brevity.

According to an embodiment of the invention, the current generating circuit may also amplify or reduce the first current $I_{11}/I_{21}$ and/or the second current $I_{12}/I_{22}$ before the operation of current subtraction, such that the slope of the temperature coefficient of the output current can be adjusted more flexibly.

Figure 4:
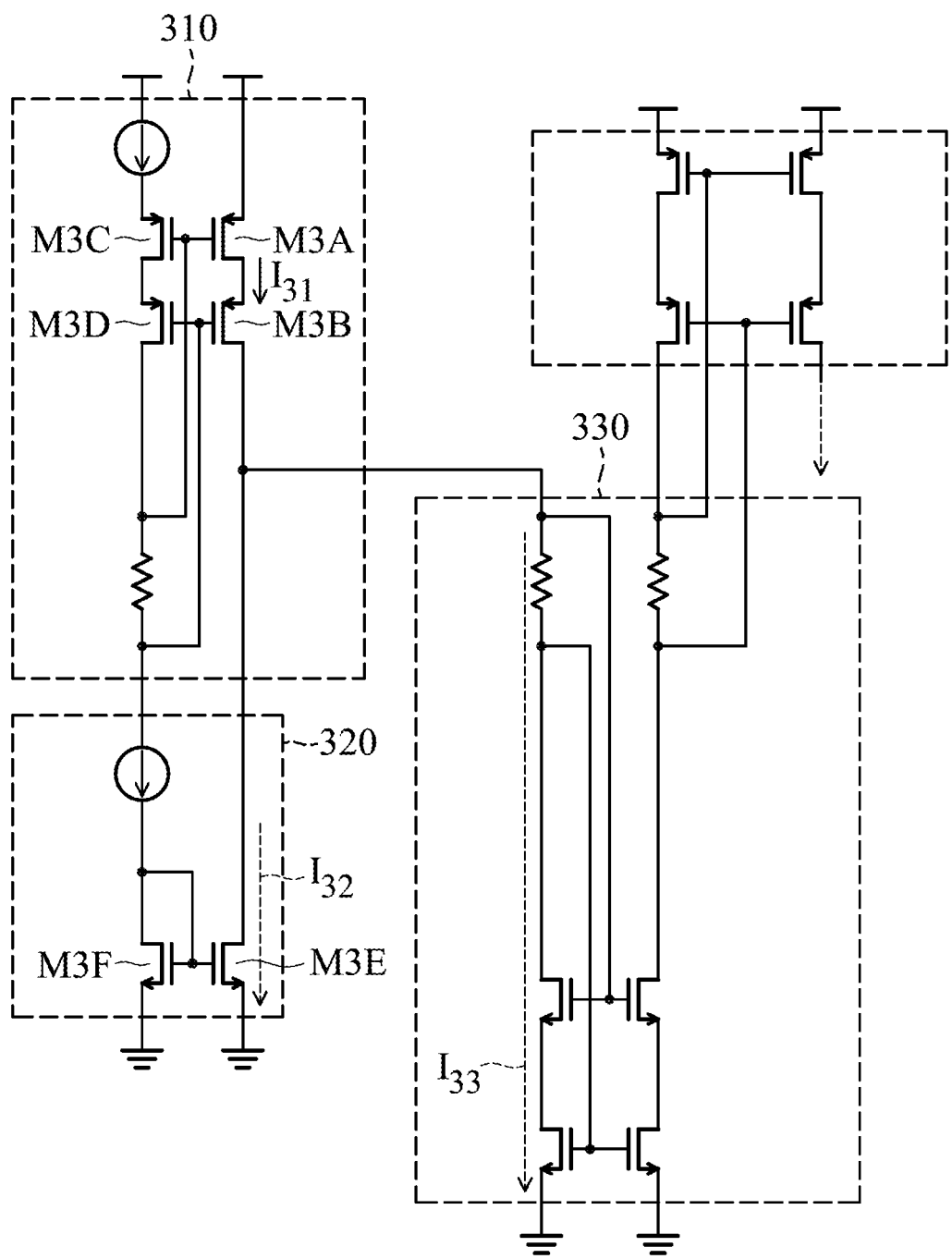
FIG. 4 is an exemplary circuit diagram of a current generating circuit according to yet another embodiment of the invention.

FIG. 4 is an exemplary circuit diagram of a current generating circuit according to yet another embodiment of the invention. The current generating circuit 300 may comprise circuit subunits 310, 320 and 330. The circuit subunit 310 may comprise a current source and a slope adjusting circuit. The current source is configured to provide a first fundamental current having a first fundamental temperature coefficient, wherein the first fundamental current may be a fundamental current $I_{CTAT}$ or $I_{PTAT}$ obtained from the Bandgap regulator. The slope adjusting circuit may comprise one or more current mirror circuits, such as the current mirror circuit formed by the transistors M3A, M3B, M3C and M3D, and configured to receive the first fundamental current and generate a first current $I_{31}$ having a first temperature coefficient based on the first fundamental current, such that the slope of the first temperature coefficient is different from the first fundamental temperature coefficient. For example, the sizes of the transistors M3A and M3B may be designed as a multiple of the sizes of the transistors M3C and M3D, so that the first fundamental current is amplified according to a predetermined ratio to generate the first current $I_{31}$. It should be noted that the sizes of the transistors M3A and M3B may also be designed to be smaller than the sizes of the transistors M3C and M3D, so as to reduce the first fundamental current according to a predetermined ratio to generate the first current $I_{31}$. According to an embodiment of the invention, the transistors M3A, M3B, M3C and M3D may be PMOS transistors.

According to an embodiment of the invention, the circuit subunit 320 may also comprise a current source and a slope adjusting circuit. The current source is configured to provide a second fundamental current having a second fundamental temperature coefficient, wherein the second fundamental current may be another fundamental current $I_{CTAT}$ or $I_{PTAT}$ obtained from the Bandgap regulator. The slope adjusting circuit may comprise one or more current mirror circuits, such as the current mirror circuit formed by the transistors M3E and M3F, and configured to receive the second fundamental current and generate the second current $I_{32}$ having the second temperature coefficient based on the second fundamental current, such that the slope of the second temperature coefficient is different from the second fundamental temperature coefficient. According to an embodiment of the invention, the transistors M3E and M3F may be NMOS transistors.

According to an embodiment of the invention, the circuit subunit 330 may be a current subtraction circuit, which generates the current $I_{33}$ according to the difference between the current $I_{31}$ and the current $I_{32}$. The structure and operation of circuit subunit 330 are similar to those of circuit subunit 130 discussed above. Therefore, the details and descriptions are the same as those for circuit subunit 130, and they are not repeated here, for brevity.

It should be noted that the invention is not limited to the circuit structures as discussed above. According to the spirit of the invention, when it is desired that the absolute value of the slope of a negative temperature coefficient be increased, this can be achieved by subtracting a current having a positive temperature coefficient from a current having a negative temperature coefficient. When it is desired that the absolute value of the slope of a positive temperature coefficient be increased, this can be achieved by subtracting a current having a negative temperature coefficient from a current having a positive temperature coefficient. In addition, when it is desired that the temperature coefficient of the output current be adjusted further, the current generating circuit may be designed to amplify and/or reduce the corresponding current(s) before and/or after the current subtraction operation. In this manner, the slope of the temperature coefficient of the output current can be adjusted with more flexibility.

The proposed current generating circuit is capable of generating currents with different temperature coefficients according to different requirements and is also capable of flexibly adjusting the slope (or gradient) of the temperature coefficient of the current. Therefore, it is suitable for a variety of circuits which has to detect or reflect the temperature variation. For example, according to an embodiment of the invention, when the proposed current generating circuit is applied in a temperature sensor, the temperature detection accuracy can be greatly improved, so as to resist changes in the characteristics of various electronic components due to PVT variations. As an example, the proposed current generating circuit can be utilized to resist the change in the intrinsic offset of the comparator comprised in a temperature detector due to PVT variations.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A current generating circuit, comprising:
    a first circuit subunit, configured to generate a first current having a first temperature coefficient, wherein the first temperature coefficient is a negative temperature coefficient;
    a second circuit subunit, configured to generate a second current having a second temperature coefficient, wherein the second temperature coefficient is a positive temperature coefficient; and
    a third circuit subunit, configured to generate a third current having a third temperature coefficient according to a difference between the first current and the second current, wherein an absolute value of a slope of the third temperature coefficient is greater than an absolute value of a slope of the first temperature coefficient or an absolute value of a slope of the second temperature coefficient,
    wherein the third current is generated by subtracting the second current from the first current or subtracting the first current from the second current,
    wherein when the third current is generated by subtracting the second current from the first current, the third temperature coefficient is a negative temperature coefficient, the absolute value of the slope of the third temperature coefficient is greater than the absolute value of the slope of the first temperature coefficient, and
    wherein when the third current is generated by subtracting the first current from the second current, the third temperature coefficient is a positive temperature coefficient, and the absolute value of the slope of the third temperature coefficient is greater than the absolute value of the slope of the second temperature coefficient.

2. The current generating circuit as claimed in claim 1, wherein the first circuit subunit comprises:
    a first current source, configured to provide a first fundamental current having a first fundamental temperature coefficient; and
    a first slope adjusting circuit, configured to receive the first fundamental current and generate the first current based on the first fundamental current, wherein a slope of the first fundamental temperature coefficient is different from the slope of the first temperature coefficient, and
    wherein the second circuit subunit comprises:
    a second current source, configured to provide a second fundamental current having a second fundamental temperature coefficient; and
    a second slope adjusting circuit, configured to receive the second fundamental current and generate the second current based on the second fundamental current, wherein a slope of the second fundamental temperature coefficient is different from the slope of the second temperature coefficient.

3. The current generating circuit as claimed in claim 2, wherein the first slope adjusting circuit comprises a current mirror circuit configured to amplify or reduce the first fundamental current according to a first ratio to generate the first current, and wherein the second slope adjusting circuit comprises a current mirror circuit configured to amplify or reduce the second fundamental current according to a second ratio to generate the second current.

4. The current generating circuit as claimed in claim 1, further comprising:
    a fourth circuit subunit, configured to receive the third current and generate a fourth current having a fourth temperature coefficient based on the third current, wherein a slope of the fourth temperature coefficient of the fourth temperature coefficient is different from that of the third temperature coefficient.

5. The current generating circuit as claimed in claim 4, wherein an absolute value of the slope of the fourth temperature coefficient is greater than the absolute value of the slope of the third temperature coefficient.

6. The current generating circuit as claimed in claim 4, wherein the fourth circuit subunit comprises a current mirror circuit configured to amplify the third current according to a third ratio to generate the fourth current.

7. The current generating circuit as claimed in claim 1, further comprising:
    a first resistor, and wherein the third circuit subunit comprises:
    a current mirror circuit, comprising a first transistor and a second transistor coupled in serial, wherein the first resistor is coupled to a drain of the first transistor, and a gate of the first transistor and a gate of the second transistor are respectively coupled to two terminals of the first resistor.

* * * * *